US010223096B2

(12) United States Patent
Ziat et al.

(10) Patent No.: US 10,223,096 B2
(45) Date of Patent: *Mar. 5, 2019

(54) LOGGING OPERATING SYSTEM UPDATES OF A SECURE ELEMENT OF AN ELECTRONIC DEVICE

(71) Applicant: Apple Inc., Cupertino, CA (US)

(72) Inventors: Mehdi Ziat, Seattle, WA (US); Kyle A. Diebolt, Cupertino, CA (US)

(73) Assignee: APPLE INC., Cupertino, CA (US)

( * ) Notice: Subject to any disclaimer, the term of this patent is extended or adjusted under 35 U.S.C. 154(b) by 82 days.

This patent is subject to a terminal disclaimer.

(21) Appl. No.: 15/224,324

(22) Filed: Jul. 29, 2016

(65) Prior Publication Data
US 2016/0335078 A1 Nov. 17, 2016

Related U.S. Application Data

(63) Continuation of application No. 14/590,933, filed on Jan. 6, 2015, now Pat. No. 9,436,455.

(60) Provisional application No. 62/044,845, filed on Sep. 2, 2014, provisional application No. 61/923,952, filed on Jan. 6, 2014.

(51) Int. Cl.
G06F 8/61 (2018.01)
G06F 8/65 (2018.01)
G06F 21/57 (2013.01)
H04L 29/06 (2006.01)

(52) U.S. Cl.
CPC .............. *G06F 8/65* (2013.01); *G06F 8/61* (2013.01); *G06F 8/62* (2013.01); *G06F 21/57* (2013.01); *H04L 63/0815* (2013.01)

(58) Field of Classification Search
CPC ..... G06F 8/61; G06F 8/62; G06F 8/65; G06F 21/57; H04L 63/0815

USPC ................................................. 717/168–178
See application file for complete search history.

(56) References Cited

U.S. PATENT DOCUMENTS

| 5,887,163 | A  | 3/1999  | Nguyen et al. |
| 6,005,942 | A  | 12/1999 | Chan et al. |
| 6,775,823 | B2 | 8/2004  | MacDonell |
| 6,792,564 | B2 | 9/2004  | Ahrens, Jr. et al. |
| 7,127,456 | B1 | 10/2006 | Brown et al. |
| 7,191,364 | B2 | 3/2007  | Hudson et al. |

(Continued)

FOREIGN PATENT DOCUMENTS

| EP | 2605202    |    | 6/2013 |
| EP | 2827275    | A1 | 1/2015 |
| WO | 2007014314 |    | 2/2007 |

OTHER PUBLICATIONS

International Search Report and Written Opinion from PCT/US2014/071481, dated Jun. 8, 2015, 9 pages.

*Primary Examiner* — Qing Chen
(74) *Attorney, Agent, or Firm* — Van Court & Aldridge LLP

(57) ABSTRACT

Systems, methods, and computer-readable media for logging secure element updates of an electronic device are provided. In one example embodiment, a method, at a secure element including a previously-installed secure element asset, includes, inter alia, receiving an update package, uninstalling the previously-installed secure element asset based on the received update package, installing a new secure element asset based on the received update package, and updating at least one of a counter on the secure element and a log on the secure element based on the installation of the new secure element asset. Additional embodiments are also provided.

15 Claims, 9 Drawing Sheets

(56) References Cited

U.S. PATENT DOCUMENTS

| | | |
|---|---|---|
| 7,506,375 B2 | 3/2009 | Kanda et al. |
| 7,519,630 B2 | 4/2009 | Brown et al. |
| 7,526,561 B2 | 4/2009 | Bloch et al. |
| 8,150,808 B2 | 4/2012 | Zha et al. |
| 8,196,131 B1 | 6/2012 | von Behren et al. |
| 8,296,756 B1 | 10/2012 | Feeser et al. |
| 8,578,214 B2 | 11/2013 | Dufour et al. |
| 8,606,765 B2 | 12/2013 | Boggs et al. |
| 9,158,605 B2 | 10/2015 | Mishra et al. |
| 9,250,933 B2 | 2/2016 | Inada |
| 9,483,249 B2 | 11/2016 | Khan et al. |
| 2002/0124213 A1 | 9/2002 | Ahrens et al. |
| 2003/0023966 A1 | 1/2003 | Shimizu et al. |
| 2003/0070162 A1 | 4/2003 | Oshima et al. |
| 2007/0078992 A1 | 4/2007 | Bloch et al. |
| 2007/0240148 A1 | 10/2007 | Inada |
| 2011/0093435 A1 | 4/2011 | Zha et al. |
| 2012/0072979 A1 | 3/2012 | Cha et al. |
| 2012/0144383 A1 | 6/2012 | Mishra et al. |
| 2012/0216007 A1 | 8/2012 | Tsirkin |
| 2013/0024383 A1 | 1/2013 | Kannappan |
| 2013/0268437 A1 | 10/2013 | Desai et al. |
| 2014/0019367 A1 | 1/2014 | Khan et al. |
| 2014/0019955 A1 | 1/2014 | Summerer |
| 2014/0108263 A1 | 4/2014 | Ortiz et al. |
| 2014/0149746 A1 | 5/2014 | Yau |
| 2015/0096045 A1 | 4/2015 | Watson |
| 2015/0178723 A1 | 6/2015 | Khan et al. |
| 2015/0193222 A1 | 7/2015 | Pirzadeh et al. |
| 2015/0193224 A1 | 7/2015 | Ziat et al. |
| 2015/0350177 A1 | 12/2015 | Sharp et al. |
| 2016/0054989 A1 | 2/2016 | Diebolt et al. |

```
BEFORE
UPDATE
                                                        VERSIONS
       PACKAGE    A 0 0 0 0 0 0 0 3 1 0 1 0 0 0          INSTANCES
         AID
       APPLET 1   A 0 0 0 0 0 0 0 3 1 0 1 0 0 0 0 0 0 0 0 0 0 1
         AID
       APPLET 2   A 0 0 0 0 0 0 0 3 1 0 1 0 0 0 0 0 0 0 0 0 0 2
         AID
       APPLET 3   A 0 0 0 0 0 0 0 3 1 0 1 0 0 0 0 0 0 0 0 0 0 3
         AID

AFTER
UPDATE
                                                        VERSIONS
       PACKAGE    A 0 0 0 0 0 0 0 3 1 0 1 0 0 1          INSTANCES
         AID
       APPLET 1   A 0 0 0 0 0 0 0 3 1 0 1 0 0 1 0 0 0 1 0 0 0 1
         AID
       APPLET 2   A 0 0 0 0 0 0 0 3 1 0 1 0 0 1 0 0 0 1 0 0 0 2
         AID
       APPLET 3   A 0 0 0 0 0 0 0 3 1 0 1 0 0 1 0 0 0 1 0 0 0 3
         AID
```

FIG. 8

LOGGING OPERATING SYSTEM UPDATES OF A SECURE ELEMENT OF AN ELECTRONIC DEVICE

CROSS-REFERENCE TO RELATED APPLICATIONS

This application is a continuation of U.S. patent application Ser. No. 14/590,933 (now U.S. Pat. No. 9,436,455), filed Jan. 6, 2015, which claims the benefit of prior filed U.S. Provisional Patent Application No. 61/923,952, filed Jan. 6, 2014, and of prior filed U.S. Provisional Patent Application No. 62/044,845, filed Sep. 2, 2014, each of which is hereby incorporated by reference herein in its entirety.

Technical Field

This disclosure relates to logging updates made on an electronic device and, more particularly, to logging operating system updates of a secure element of an electronic device.

Background Of The Disclosure

Portable electronic devices (e.g., cellular telephones) may be provided with near field communication ("NFC") components for enabling contactless proximity-based communications with another entity. Often times, these communications are associated with financial transactions or other secure data transactions that require the electronic device to access and share a commerce credential, such as a credit card credential, with the other entity in a contactless proximity-based communication. Such credentials are often provided on a secure element of the electronic device that is not accessible by normal functionalities of the electronic device, including debugging mechanisms.

SUMMARY OF THE DISCLOSURE

This document describes systems, methods, and computer-readable media for logging operating system updates of a secure element of an electronic device.

As an example, an electronic device may include a networking subsystem configured to communicate with an updating device, and a secure element configured to receive, from the updating device via the networking subsystem, an update package including an update to an asset installed on the secure element, identify at least one previous version of the asset installed on the secure element, uninstall the at least one previous version of the asset, install the update to the asset, and update at least one of a counter on the secure element and a log on the secure element based on the update to the asset.

As another example, an electronic device may include a networking subsystem configured to communicate with an updating device, and a secure element including a processor and memory, coupled to the processor, which stores a program module configured to be executed by the processor, the program module including instructions for receiving, from the updating device via the networking subsystem, an update package, wherein the update package includes an update to an asset installed on the secure element, instructions for identifying at least one previous version of the asset installed on the secure element, instructions for uninstalling the at least one previous version of the asset, instructions for installing the update to the asset, and instructions for updating at least one of a counter on the secure element and a log on the secure element based on the update to the asset.

As another example, a method may include, at a secure element including a previously-installed secure element asset, receiving an update package, uninstalling the previously-installed secure element asset based on the received update package, installing a new secure element asset based on the received update package, and updating at least one of a counter on the secure element and a log on the secure element based on the installation of the new secure element asset.

As yet another example, a secure element for use in an electronic device may include a processor and memory, coupled to the processor, which stores a program module configured to be executed by the processor, the program module including instructions for receiving an update package, wherein the update package includes an update to an operating system installed on the secure element, instructions for identifying at least one previous version of the operating system installed on the secure element, instructions for uninstalling the at least one previous version of the operating system, instructions for installing the update to the operating system, and instructions for updating a log on the secure element based on the update to the operating system.

As yet another example, a computer-program product for use in conjunction with a secure element may be provided, where the computer-program product includes a non-transitory computer-readable storage medium and a computer-program mechanism embedded therein, to update the secure element, the computer-program mechanism including instructions for receiving an update package, wherein the update package includes an update to an asset installed in the secure element, instructions for identifying at least one previous version of the asset installed on the secure element, instructions for uninstalling the at least one previous version of the asset, instructions for installing the update to the asset, and instructions for updating at least one of a counter on the secure element and a log on the secure element based on the update to the asset.

This Summary is provided merely to summarize some example embodiments, so as to provide a basic understanding of some aspects of the subject matter described in this document. Accordingly, it will be appreciated that the features described in this Summary are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

The discussion below makes reference to the following drawings, in which like reference characters may refer to like parts throughout, and in which:

FIG. 8 is a diagram illustrating registry entries in a secure element in an electronic device of the system of FIG. 1.

DETAILED DESCRIPTION OF THE DISCLOSURE

A counter and a logging mechanism may be provided on a secure element of an electronic device for tracking updates made to one or more types of secure element assets of the secure element, such as payment applets of the secure element and operating systems of the secure element. A counter may be configured to be updated each time any secure element asset is update don the secure element, while a logging mechanism may be updated with the value of the counter whenever the counter is updated and/or updated with a description of a secure element operating system asset when that asset is updated on the secure element. Such a log may be leveraged by any non-secure element component of the electronic device and/or any remote device for analyzing the history of the secure element (e.g., for debugging purposes).

Figure 1:
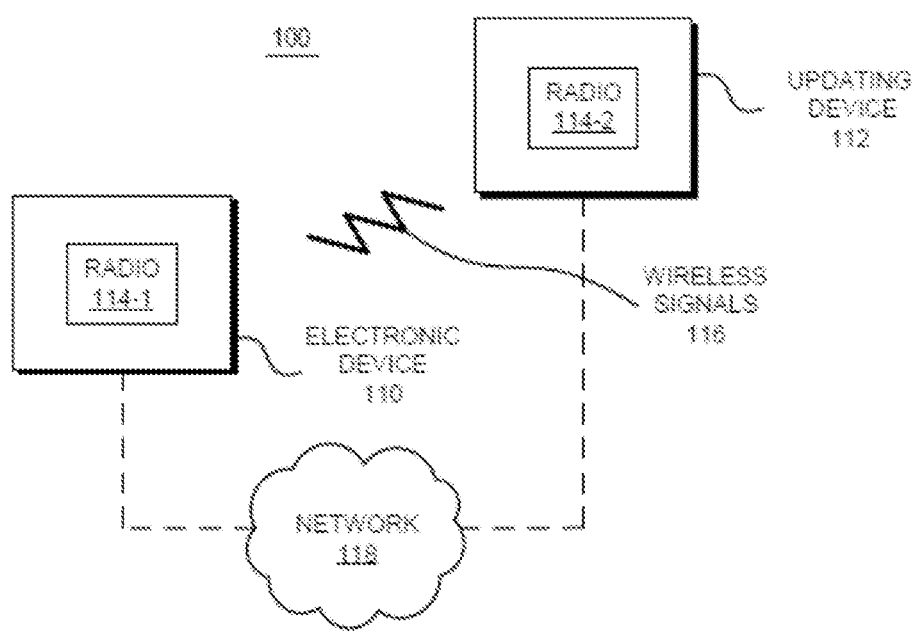
FIG. 1 is a schematic view of an illustrative system for logging secure element updates of an electronic device.

Description of FIG. 1

An electronic device (e.g., a cellular telephone) may automatically install and personalize updates to an applet and/or to an operating system on a secure element in the electronic device. In particular, when an update package (e.g., a digitally signed update package) containing such an update to a secure element applet and/or to a secure element operating system (e.g., as may be collectively referred to herein as a secure element asset) may be received from an updating device (e.g., a server), the secure element may identify any previous versions of the secure element asset installed on the secure element. If there are any previously installed versions, the secure element may verify the digital signature of the update package using an encryption key associated with a vendor of the secure element. Then, the secure element may uninstall the previous version(s) of the secure element asset and may export any user data that may be associated with the previous version(s). Next, the secure element may install the update to the secure element asset, and may personalize the new version of the secure element asset using the user data. In this way, the electronic device may provide a scalable update solution while maintaining the personalization from the previous versions of the secure element asset. Moreover, a logging mechanism or log may be maintained on the secure element that may track the identity of some of or all of the original, previous, and/or current secure element assets of the secure element, where such a log may be retrieved and utilized in any suitable way by another component of the electronic device (e.g., a processing system processor) and/or by another device in a system (e.g., an external reader) for debugging or any other suitable purpose.

A secure element asset update package may be received via wireless communication between the electronic device and an updating device. Such a wireless communication may involve conveying packets that are transmitted and received by radios in the electronic device and the updating device in accordance with any suitable communication protocol, such as an Institute of Electrical and Electronics Engineers ("IEEE") 802.11 standard, Bluetooth™ (e.g., from the Bluetooth Special Interests Group of Kirkland, Wash.), and/or any other type of wireless interface, such as a near-field-communication ("NFC") standard or specification (e.g., from the NFC Forum of Wakefield, Mass.). In addition, the communication protocol may be compatible with a $3^{rd}$ generation of mobile telecommunications technology (e.g., a communication protocol that complies with the International Mobile Telecommunications-2000 specifications by the International Telecommunication Union of Geneva, Switzerland), a $4^{th}$ generation of mobile telecommunications technology (e.g., a communication protocol that may comply with the International Mobile Telecommu-nications Advanced specification by the International Telecommunication Union of Geneva, Switzerland), and/or another cellular-telephone communication technique. In the discussion that follows, a cellular-telephone communication technique is used as an illustrative example.

The communication between the electronic device and the updating device may be shown by a system 100 of FIG. 1, which presents a block diagram illustrating an electronic device 110 in communication with an updating device 112. As described further below with reference to FIGS. 3-7, these electronic devices may communicate when updating device 112 (e.g., a server or an update computer) may provide an update package with an update to a previously loaded secure element asset (e.g., a new version of the secure element asset) that may be installed on electronic device 110 (e.g., a cellular telephone). For example, the previous version of the secure element asset may be installed on a secure element in electronic device 110. In addition, in some embodiments, a user of electronic device 110 may have previously customized or personalized the previous version with user data.

In at least one of the update techniques described below, the secure element may determine if the update package is relevant for electronic device 110 by identifying at least one, and, in some embodiments, all, previously installed versions or instances of the secure element asset. Then, the secure element may authenticate the update package by verifying a digital signature, which may be associated with a vendor of the secure element. Alternatively, the digital signature may be associated with a provider of electronic device 110 or a secure element asset installed on a secure element in electronic device 110. For example, the secure element may use an encryption key associated with the vendor (e.g., a public encryption key) to verify the update package. Additionally or alternatively, the secure element may decrypt the update package using a second encryption key, which may be the same or different from the encryption key. In an exemplary embodiment, a public-private encryption-key technique may be used. In particular, an update package may be signed using a private encryption key of the vendor, and the digital signature may be verified and/or the update package may be decrypted using the public encryption key of the vendor. However, in other embodiments, a symmetric encryption technique may be used. Thus, the same encryption key may be used to sign, encrypt, and/or decrypt an update package. Then, the secure element may uninstall the at least one, and, in some embodiments, all, previous versions of the secure element asset and may export any user data that may be associated with that secure element asset. Next, the secure element may install the update to the secure element asset, and may personalize the new version of the secure element asset using the user data. In these ways, electronic device 110 and updating device 112 may be used to securely and flexibly disseminate and install updates to one or more secure element asset previously installed on electronic device 110.

During or immediately after such a process of updating a secure element asset on a secure element of electronic device 110 (e.g., based on an update package that may be received from updating device 112), electronic device (e.g., the secure element of electronic device 110) may be configured to add to, remove from, or otherwise edit an information log that may track the identity of some of or all of the original, previous, and/or current secure element assets of the secure element. Such a log may include any suitable information of any suitable type (e.g., one or more data strings, vector matrix of octet strings, hex number(s), a cyclic file, etc.) that may be descriptive of one or more of the original, previous, and/or current secure element assets of the secure element of electronic device 110, the value of a counter or any other suitable mechanism that may be used to at least relatively provide a sense of timing, and/or any other suitable data. Such information of such a log may be retrieved and utilized in any suitable way by another component of electronic device 110 (e.g., a processing system processor of electronic device 110) and/or by another device in system 100 (e.g., by any suitable device 112, such as an external reader), where such retrieved log information may be used for debugging electronic device 110 or for any other suitable purpose.

As noted previously, the communication between electronic device 110 and/or updating device 112 may involve the exchange of packets that may include the update package. These packets may be included in frames in one or more wireless channels. As described further below with reference to FIG. 2, electronic device 110 and/or updating device 112 may include one or more subsystems, such as a networking subsystem, a memory subsystem, a processing subsystem, and a secure subsystem. In addition, as shown in FIG. 1, for example, electronic device 110 and/or updating device 112 may include radios 114 in a networking subsystem of that device (e.g., radio 114-1 of electronic device 110 and/or radio 114-2 of updating device 112). More generally, electronic device 110 and/or updating device 112 can include, or can be included within, any electronic devices with networking subsystems that may enable electronic device 110 and/or updating device 112 to wirelessly communicate with another electronic device. This can include transmitting frames on wireless channels that may enable electronic devices to make initial contact, followed by exchanging subsequent data/management frames (e.g., connect requests to establish a connection), configuring security options (e.g., internet protocol security ("IPSEC")), transmitting and receiving packets or frames, and the like.

As shown in FIG. 1, for example, wireless signals 116 (e.g., as represented by a jagged line) may be transmitted from/received by a radio 114-1 in electronic device 110. These wireless signals may be received by/transmitted by radio 114-2 in updating device 112. It is to be understood that the communication between electronic device 110 and/or updating device 112 may also occur via network 118, which may involve any wired or wireless communication with a different communication protocol than wireless signals 116. Moreover, the wireless communication may or may not involve a connection being established between electronic device 110 and/or updating device 112, and, therefore, may or may not involve communication via a wireless network (e.g., a cellular-telephone network).

Processing a packet or frame in electronic device 110 and/or updating device 112 may include receiving wireless signals 116 with the packet or frame, decoding/extracting the packet or frame from received wireless signals 116 to acquire the packet or frame, and/or processing the packet or frame to determine information that may be contained in the packet or frame (e.g., at least a portion of the update package). As noted previously, communication among electronic device 110 and/or updating device 112 may be encrypted. Such encryption may use an encryption key (e.g., an encryption key that may be associated with a secure element asset and/or a vendor of the secure element). Additionally or alternatively, such encryption may use symmetric or asymmetric encryption techniques.

Although the environment shown in FIG. 1 is used as an example of system 100 herein, in alternative embodiments, different numbers or types of electronic devices may be present. For example, some system embodiments may include more or fewer electronic devices. As another example, in another embodiment, different electronic devices may be transmitting and/or receiving packets or frames.

Figure 2:
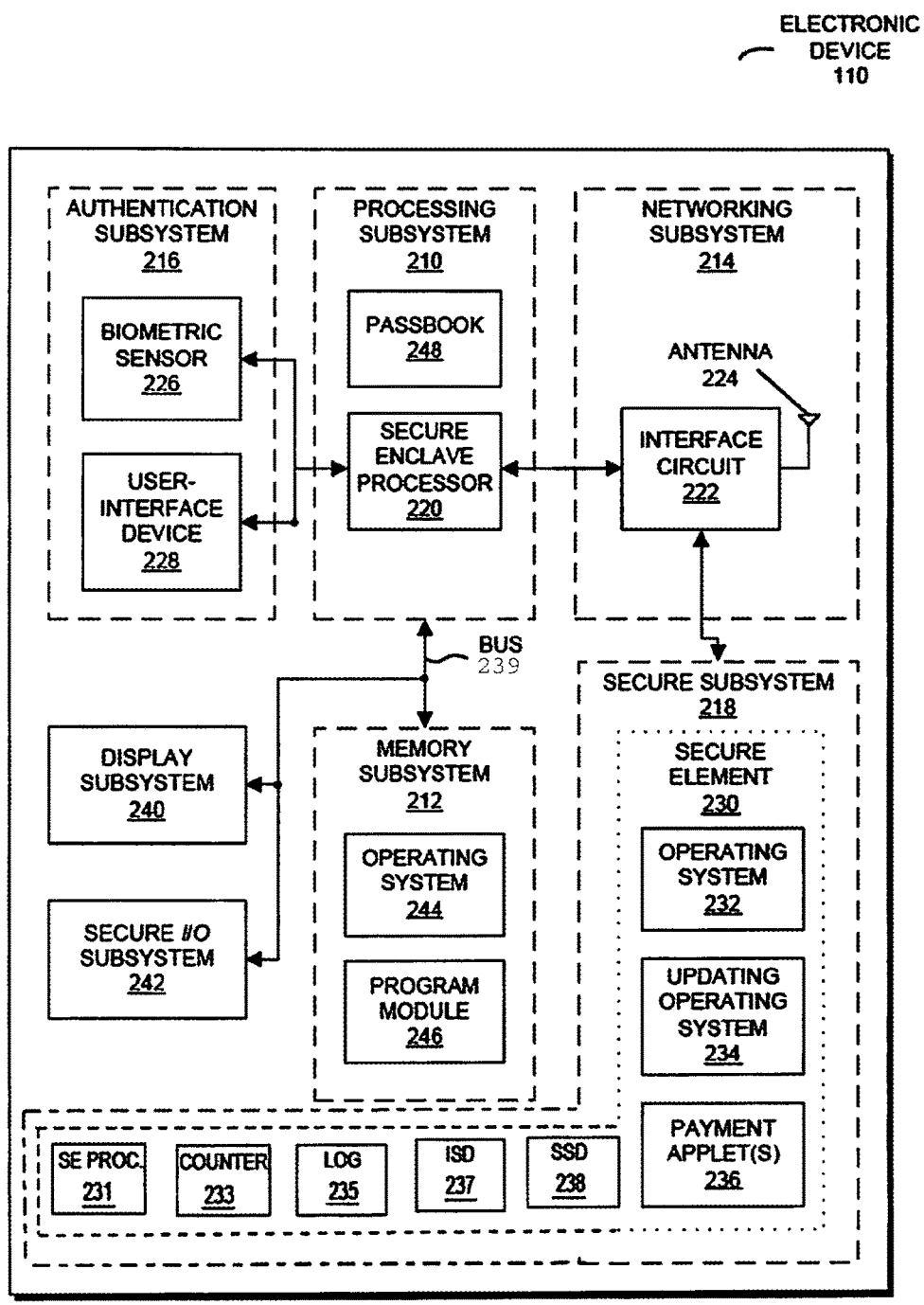
FIG. 2 is a more detailed schematic view of an electronic device of the system of FIG. 1.

Description of FIG. 2

Referring now to FIG. 2, FIG. 2 presents a block diagram illustrating a more detailed view of electronic device 110 of system 100 of FIG. 1. As shown, for example, electronic device 110 may include a processing subsystem 210, a memory subsystem 212, a networking subsystem 214, an authentication subsystem 216, and/or a secure subsystem 218. Processing subsystem 210 may include one or more devices that may be configured to perform one or more computational operations. For example, processing subsystem 210 may include one or more microprocessors, application-specific integrated circuits ("ASICs"), microcontrollers, programmable-logic devices, and/or one or more digital signal processors ("DSPs").

Additionally or alternatively, processing subsystem 210 may include a secure enclave processor ("SEP") 220 (e.g., a system-on-chip within one or more processors in processing subsystem 210) that may perform one or more security services for one or more other components in the processing subsystem 210 and/or that may securely communicate with other subsystems in electronic device 110. Secure enclave processor 220 may include one or more processors, a secure boot read-only memory ("ROM"), one or more security peripherals, and/or any other suitable components. The security peripherals may be hardware-configured to assist in the secure services that may be performed by secure enclave processor 220. For example, the security peripherals may include authentication hardware that may implement various authentication techniques, encryption hardware that may be configured to perform encryption, secure-interface controllers that may be configured to communicate over a secure interface to other components, and/or other suitable components. In some embodiments, instructions that may be executable by secure enclave processor 220 may be stored in a trust zone in memory subsystem 212 that may be assigned to secure enclave processor 220, and secure enclave processor 220 may fetch the instructions from the trust zone for execution. Secure enclave processor 220 may be isolated from the rest of processing subsystem 210 except for a carefully controlled interface, which may thereby form a secure enclave for secure enclave processor 220 and its components. As the interface to secure enclave processor 220 may be carefully controlled, direct access to components within secure enclave processor 220 (e.g., a processor or a secure boot ROM) may be prevented. In some embodiments, secure enclave processor 220 may encrypt and/or decrypt and/or otherwise reformat authentication information that may be communicated with authentication subsystem 216, and/or may encrypt and/or decrypt and/or otherwise reformat information (e.g., tokens) that may be communicated with secure subsystem 218. Furthermore, secure enclave processor 220 may compare authentication information with stored authentication and, if a match is obtained, may provide an encrypted token with an authentication-complete indicator to a secure element (e.g., a secure element 230 of secure subsystem 218) and/or may assert the authentication-complete indicator as a flag in an operating system (e.g., in an operating system 244 of memory subsystem 212).

Memory subsystem 212 may include one or more devices for storing data and/or instructions for processing subsystem 210, networking subsystem 214, authentication subsystem 216, and/or secure subsystem 218. For example, memory subsystem 212 can include dynamic random access memory ("DRAM"), static random access memory ("SRAM"), and/or any other suitable type of memory. In some embodiments, instructions for processing subsystem 210 in memory subsystem 212 may include one or more program modules or sets of instructions (e.g., program module 246, which may be a digital wallet, a passbook, and/or a mobile payments application), which may be executed by processing subsystem 210. It is to be understood that the one or more computer programs may constitute a computer-program mechanism or a program module. Moreover, instructions in the various modules in memory subsystem 212 may be implemented in a high-level procedural language, an object-oriented programming language, and/or in an assembly or machine language. Furthermore, the programming language may be compiled or interpreted (e.g., configurable or configured, which may be used interchangeably in this discussion) to be executed by processing subsystem 210.

Additionally or alternatively, memory subsystem 212 can include one or more mechanisms for controlling access to the memory. In some embodiments, memory subsystem 212 may include a memory hierarchy that may include one or more caches that may be coupled to a memory in electronic device 110. In some of these embodiments, one or more of the caches may be located in processing subsystem 210.

In some embodiments, memory subsystem 212 may be coupled to one or more high-capacity mass-storage devices (not shown). For example, memory subsystem 212 can be coupled to a magnetic or optical drive, a solid-state drive, or another type of mass-storage device. In such embodiments, memory subsystem 212 can be used by electronic device 110 as fast-access storage for often-used data, while the mass-storage device may be used to store less frequently used data.

Networking subsystem 214 may include one or more devices that may be configured to couple to and/or communicate on a wired and/or wireless network (e.g., to perform network operations), which may include an interface circuit 222 (e.g., a near-field-communication circuit) and/or an antenna 224. For example, networking subsystem 214 can include a Bluetooth™ networking system, a cellular networking system (e.g., a 5G/4G network, such as UMTS, LTE, etc.), a universal serial bus ("USB") networking system, a networking system based on one or more of the standards described in IEEE 802.11 (e.g., a Wi-Fi networking system), an Ethernet networking system, and/or any other suitable communication system (e.g., a near-field-communication system).

Networking subsystem 214 may include one or more processors, controllers, radios/antennas, sockets/plugs, and/or any other suitable devices that may be used for coupling to, communicating on, and/or handling data and/or events for each supported networking or communication system. It is to be understood that mechanisms that may be used for coupling to, communicating on, and/or handling data and/or events on the network for each network system may sometimes be collectively referred to as a "network interface" for the network system. Moreover, in some embodiments a "network" between electronic devices may not yet exist. Therefore, electronic device 110 may use one or more mechanisms in networking subsystem 214 for performing simple wireless communication between electronic device 110 and updating device 112 of FIG. 1 (e.g., for transmitting advertising frames and/or near-field communication).

Authentication subsystem 216 may include one or more processors, controllers, and/or other suitable devices for receiving authentication information from a user of electronic device 110, and/or for securely communicating authentication information to processing subsystem 210 (e.g., by encrypting the authentication information). For example, the authentication information may include a biometric identifier that may be acquired by a biometric sensor 226 (e.g., a fingerprint sensor, a retinal sensor, a palm sensor, a digital signature-identification sensor, etc.), a personal identification number ("PIN") that may be associated with one or more payment applets (e.g., one or more payment applets 236 of secure element 230 of secure subsystem 218) that may be received using a user-interface device 228 (e.g., a keypad, a touch-sensitive display, optical character recognition, and/or voice recognition), and/or a passcode for unlocking at least some functionality of electronic device 110 that may be received using user-interface device 228.

Furthermore, secure subsystem 218 may include a secure element 230, which may include one or more processors and/or memory. Secure element 230 may be a tamper-resistant component that may be used in electronic device 110 to provide the security, confidentiality, and/or multiple application environments that may be required to support various business models. Secure element 230 may exist in one or more of a variety of form factors, such as a universal integrated circuit card ("UICC"), an embedded secure element (e.g., on a circuit board in electronic device 110), a smart secure digital ("SD") card, a smart microSD card, and the like.

Moreover, secure element 230 may include one or more applets or applications that may execute in an environment of secure element 230 (e.g., in a main operating system 232 of secure element 230, and/or in a Java runtime environment executing on secure element 230). For example, the one or more applets may include an authentication applet that may perform contactless registry services, encrypt/decrypt packets or tokens communicated with secure enclave processor 220, set one or more software flags (e.g., an authentication-complete flag) in operating system 232 of secure element 230, and/or convey information to one or more payment applets 236. The one or more applets may include one or more payment applets 236 that may conduct financial transactions with another electronic device when they are activated by program module 246, and/or based on one or more software flags, and/or when electronic device 110 may be proximate to another electronic device (e.g., such as in a range of 1-10 centimeters for an NFC communication). In particular, payment applets 236 may each be associated with a financial vehicle (e.g., a credit card, a debit card, a prepaid debit card, a gift card and, more generally, a financial vehicle that may be provided by a financial institution (e.g., a bank) that may be associated with a financial account of a user, such as a user of electronic device 110). In addition, secure element 230 may include information that may be associated with the one or more payment applets 236 (e.g., a financial credential (e.g., a device primary account number ("DPAN"), a PIN (e.g., for a debit-card number) that may be associated with a given payment applet, and/or one or more encryption keys that may be associated with a given payment applet) that may be used when conducting a financial transaction. It is to be understood that a DPAN may be associated with, but different than, a financial primary account number ("FPAN") for a financial account, such as a credit card number, where the DPAN may be a virtual identifier for the financial account.

An authentication applet may execute in a master security domain or issuer security domain ("ISD") or controlling authority security domain ("CASD") or any other suitable known or high level security domain in secure element 230 (e.g., ISD 237), while payment applets 236 may execute in supplemental security domains ("SSD") in secure element 230 (e.g., SSD 238, which may include or be associated with one or more particular payment applets 236). Communication between these security domains may be encrypted using different encryption/decryption keys that may be security-domain specific. In electronic device 110 and/or during communication between electronic device 110 and/or updating device 112, encryption/decryption may involve symmetric and/or asymmetric encryption. Additionally or alternatively, the information communicated may include a digital signature that may be specific to electronic device 110 and/or components in electronic device 110, such as secure element 230 and/or one of payment applets 236, SSD 238, and/or ISD 237.

During operation of electronic device 110, the user may use passbook 248 to select or activate one or more of payment applets 236. If the payment applet supports an authentication-complete flag (e.g., as may be indicated by the enabling or setting of authentication support in the payment applet), in order for the payment applet to conduct a financial transaction with another electronic device, the payment applet may need to be activated and the authentication-complete flag may need to be set or enabled in secure element 230 (e.g., for indicating that the user has been authenticated). In contrast, for one of payment applets 236 that may not support the authentication-complete flag, a financial transaction may be conducted when this payment applet is active (e.g., operation of the payment applet may not be gated by the setting or enabling of the authentication-complete flag in secure element 230). While the present discussion illustrates the use of a global authentication-complete flag, it is to be understood that, in some embodiments, there may be separate authentication-complete flags associated with at least some of payment applets 236 (e.g., there may be a specific authentication-complete flag for a given payment applet, etc.).

When electronic device 110 may be proximate to the other electronic device (e.g., a point-of-sale ("POS" terminal) or when secure enclave processor 220 may provide a payment command to secure element 230, one of the specified, activated, and/or authenticated payment applets 236 may provide a payment packet, which may be encrypted or unencrypted, to interface circuit 222 or to secure enclave processor 220, which may then provide the payment packet to interface circuit 222. Then, interface circuit 222 may communicate the payment packet to the other electronic device (e.g., a POS terminal) using antenna 224. It is to be understood that the payment packet may include financial information (e.g., a financial credential or a DPAN that may be associated with the one of the payment applets 236).

Such financial information, as well as any additional information that may be provided by the other electronic device (e.g., a merchant identifier, an amount of the financial transaction, etc.), may be communicated by the other electronic device to a payment network 118 to complete a financial transaction. Once the financial transaction is complete, a notification from a management electronic device, which may be associated with a provider of electronic device 110, may be received by interface circuit 222. Passbook 248 may provide the notification to display subsystem 240 for display, so the user of electronic device 110 can be alerted that the financial transaction was successfully completed.

As noted previously, during an update of a secure element asset (e.g., of a payment applet 236 and/or of an operating system 234 of secure element 230 of electronic device 110), electronic device 110 may receive a digitally signed update package from updating device 112. In particular, interface circuit 222 may receive the update package, and may provide the update package to processing subsystem 210 (e.g., secure enclave processor 220). Then, processing subsystem 210 (e.g., secure enclave processor 220) may securely communicate the update package to secure element 230. In response, at least when the update package is for updating a payment applet type of secure element asset, main SE operating system 232, or a program module executed by a secure element processor ("SE PROC.") 231 in secure element 230 in an environment of main SE operating system 232, may identify at least one previous version of one of payment applets 236 that may be installed on secure element 230. For example, the at least one previous version of one of applets 236 may be identified by searching a registry associated with main SE operating system 232. Alternatively or additionally, at least when the update package is for updating an operating system type of secure element asset, updating SE operating system 234, or a program module executed by a mini-controller or processor in secure element 230 in an environment of updating SE operating system 234, may identify at least one previous version of main SE operating system 232 that may be installed on secure element 230. For example, the at least one previous version of main SE operating system 232 may be identified by searching a registry associated with updating SE operating system 234.

Moreover, continuing at least with the example of an update package for updating an applet type secure element asset, main SE operating system 232 may verify a digital signature of such an update package using an encryption key that may be associated with a vendor of secure element 230 or a vendor of the applet (e.g., a key associated with ISD 237 and/or SSD 238). In some embodiments, main SE operating system 232 may decrypt the update package using a second encryption key that may be associated with the vendor of secure element 230 or the vendor of the applet. This second encryption key may be the same as or different from the encryption key. Next, main SE operating system 232 may uninstall the at least one previous (e.g., currently existing) version of the applet, and may export any suitable user data that may be associated with the at least one previous version of the applet. Furthermore, main SE operating system 232 may install the update to the applet (e.g., the new applet 236), and may personalize the applet using at least a portion of any of the user data that may have been exported. The uninstalling or deleting, exporting, installing, and/or personalizing of an applet may occur within a security domain on secure element 230 (e.g., within SSD 238 associated with that applet).

Alternatively or additionally, one or more of the aforementioned operations that may be performed by main SE operating system 232 may be performed by an updating SE operating system 234 (e.g., a high-end boot loader) that may be executed by the processor (e.g., SE processor 231 or any other suitable processor, which may be specifically associated with or uniquely used by updating SE operating system 234) in secure element 230. Updating SE operating system 234 may be separate from main SE operating system 232, which may perform other functions of secure element 230.

Updating SE operating system 234 may update portions of main SE operating system 232 and/or software associated with one or more of applets 236. For example, continuing with the example of an update package for updating an operating system type secure element asset, updating SE operating system 234 may verify a digital signature of such an update package using an encryption key that may be associated with a vendor of secure element 230 (e.g., a key associated with ISD 237) or the vendor of the secure element operating system. In some embodiments, updating SE operating system 234 may decrypt the update package using a second encryption key that may be associated with the vendor of secure element 230 or the vendor of the secure element operating system. This second encryption key may be the same as or different from the encryption key. Next, updating SE operating system 234 may uninstall the at least one previous (e.g., currently existing) version of main SE operating system 232, and may export any suitable user data that may be associated with the at least one previous version of the main SE operating system 232. Furthermore, updating SE operating system 234 may install the update to the main SE operating system (e.g., the new main SE operating system 232), and may personalize the main SE operating system using at least a portion of any of the user data that may have been exported. The uninstalling or deleting, exporting, installing, and/or personalizing of the main SE operating system may occur within secure element 230. In some embodiments, updating SE operating system 234 may be configured to update both an applet and a main SE operating system concurrently (e.g., in response to a single update package or two serially received update packages).

As shown in FIG. 2, secure subsystem 218 may also include a log 235 that may be configured to track some, any, or all updates made to secure element assets of secure element 230. Log 235 may be any suitable data structure or memory location on secure element 230 that may be updated or otherwise edited by main SE operating system 232 and/or updating SE operating system 234 during or after such a process of updating a secure element asset (e.g., an applet or main SE operating system) on secure element 230. Such an update may include the addition of a new entry in the log 235 that may be indicative of any suitable information descriptive of a newly added applet or main SE operating system (e.g., version name, date of generation (e.g., globally or for device 110), or any other suitable information). Such information may be stored as any suitable data type in log 235, such as one or more data strings, vector matrices of octet strings, hex number(s), and the like.

Moreover, as also shown in FIG. 2, secure subsystem 218 may also include a counter 233 that may be configured to be updated in response to some, any, or all updates made to secure element assets of secure element 230. Counter 233 may be any suitable data structure or memory location on secure element 230 that may be updated or otherwise edited by main SE operating system 232 and/or updating SE operating system 234 during or after such a process of updating a secure element asset (e.g., an applet or main SE operating system) on secure element 230. Such an update may include an increment of a value of counter 233 each time a new applet or main SE operating system is updated. In some embodiments, counter 233 may be configured as a counter according to an industry standard, such as GlobalPlatform, for example, where counter 233 may be a "Sequence Counter" as may be defined by "GlobalPlatform Card Specification, Version 2.2.1," which is incorporated by reference herein in its entirety. In some embodiments, each time an entry is made to log 235, the current value of counter 233 may be associated with and/or added to that entry, such that a reference to time may be gleamed from that counter value when log 235 is analyzed.

Within electronic device 110, processing subsystem 210, memory subsystem 212, networking subsystem 214, authentication subsystem 216, and secure subsystem 218 may be coupled together using one or more interconnects, such as bus 239. These interconnects may include an electrical, optical, and/or electro-optical connection that the subsystems can use to communicate commands and data among one another. It is to be understood that different embodiments can include a different number or configuration of electrical, optical, and/or electro-optical connections among the subsystems. In some embodiments, electronic device 110 can detect tampering with secure components (e.g., secure enclave processor 220, secure element 230, and/or bus 239) and may destroy encryption/decryption keys or authentication information (e.g., a stored biometric identifier) if such tampering is detected.

In some embodiments, electronic device 110 may include display subsystem 240 for displaying information on a display (e.g., a notification of a successfully completed financial transaction or any suitable update or any other suitable user interface information), which may include a display driver and the display, such as a liquid-crystal display, a multi-touch touchscreen, and the like. In addition, in some embodiments, electronic device 110 may include a secure input/output ("I/O") subsystem 242 (e.g., a keypad) for receiving the PIN of a user that may be associated with one of payment applets 236. As noted previously, display subsystem 240 and/or secure I/O subsystem 242 may be included in authentication subsystem 216 or otherwise.

Electronic device 110 can be, or can be included in, any electronic device with at least one network interface. For example, electronic device 110 can be, or can be included in, a desktop computer, a laptop computer, a server, a media player (e.g., an MP3 player), an appliance, a subnotebook/netbook, a tablet computer, a smartphone, a cellular telephone, a piece of testing equipment, a network appliance, a set-top box, a personal digital assistant ("PDA"), a toy, a controller, a digital signal processor, a game console, a computational engine within an appliance, a consumer-electronic device, a portable computing device, a personal organizer, and/or any other suitable electronic device.

Although specific components may be used to describe electronic device 110, in alternative embodiments, different components and/or subsystems may be present in electronic device 110. For example, electronic device 110 may include one or more additional processing subsystems, memory subsystems, networking subsystems, authentication subsystems, secure subsystems, display subsystems, and/or secure I/O subsystems. Additionally, one or more of the subsystems may not be present in electronic device 110. Moreover, in some embodiments, electronic device 110 may include one or more additional subsystems that are not shown in FIG. 2. For example, electronic device 110 can include one or more of a data collection subsystem, an audio and/or video subsystem, an alarm subsystem, a media processing subsystem, and/or any other suitable subsystem. Also, although separate subsystems may be shown in FIG. 2, in some embodiments, some or all of a given subsystem or component can be integrated into one or more of the other subsystems or components in electronic device 110. For example, in some embodiments, program module 246 may be included in operating system 244. Alternatively or additionally, at least some of the functionality of program module 246 may be included in passbook 248.

Moreover, circuits and/or components in electronic device 110 may be implemented using any combination of analog and/or digital circuitry, including bipolar, P-type metal-oxide-semiconductor ("PMOS"), and/or N-type metal-oxide-semiconductor ("NMOS") gates or transistors. Furthermore, signals in these embodiments may include digital signals that may have approximately discrete values and/or analog signals that may have continuous values. Additionally, components and circuits may be single-ended or differential, and power supplies may be unipolar or bipolar.

One or more integrated circuits may implement some or all of the functionality of networking subsystem 214 (e.g., a radio) and, more generally, some or all of the functionality of electronic device 110. Moreover, the one or more integrated circuits may include hardware and/or software mechanisms that may be used for transmitting wireless signals from electronic device 110 to, and/or receiving signals at electronic device 110 from, updating device 112. Networking subsystem 214 and/or the one or more integrated circuits can include any number of radios. Note that the radios in multiple-radio embodiments may function in a similar way to the radios described in single-radio embodiments.

In some embodiments, networking subsystem 214 and/or the one or more integrated circuits may include a configuration mechanism (e.g., one or more hardware and/or software mechanisms) that may configure the radio(s) to transmit and/or receive on a given communication channel (e.g., a given carrier frequency). For example, in some embodiments, the configuration mechanism can be used to switch the radio from monitoring and/or transmitting on a given communication channel to monitoring and/or transmitting on a different communication channel. It is to be understood that "monitoring" as used herein may include receiving signals from other electronic devices and possibly performing one or more processing operations on the received signals (e.g., determining if the received signal may include an advertising frame, etc.).

While a communication protocol compatible with a cellular-telephone network may be used as an illustrative example, the described embodiments of the update and log operations and techniques may be used in a variety of network or communication interfaces. Furthermore, while some of the operations of the disclosure may be implemented in hardware or software, in general the operations of the disclosure may be implemented in a wide variety of configurations and architectures. Therefore, some or all of the operations of the disclosure may be performed in hardware, in software, or in any combination of both.

While the preceding discussion may focus on the hardware, software, and functionality in electronic device 110, updating device 112 may have the same or similar hardware (e.g., processors, memory, networking interfaces, etc.) and/or software to support the operations that may be performed by these entities, as may be described further below with reference to FIGS. 3-7. In particular, these entities may include one or more computer systems with a processing subsystem that may execute one or more program modules that may be stored in a memory subsystem to perform the operations, and one or more networking interfaces that may communicate with other electronic devices, such as electronic device 110.

Figure 3:
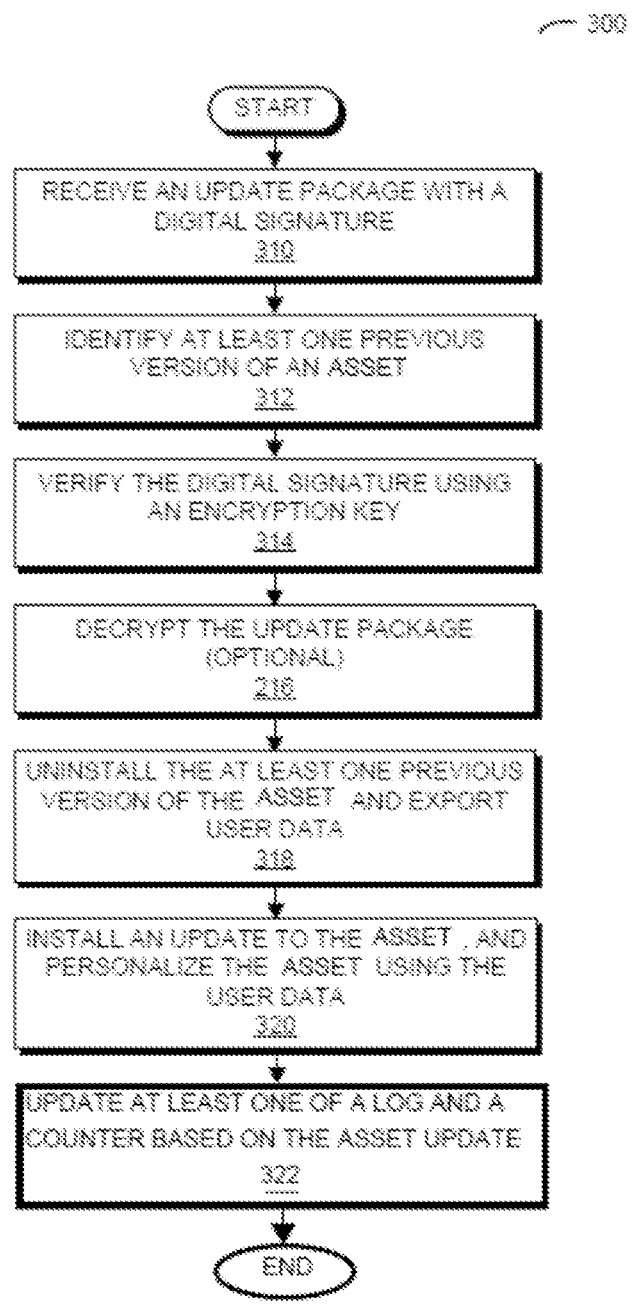
FIGS. 3-7 are flowcharts of illustrative processes for updating secure element assets and/or logs and/or counters of a secure element of an electronic device of the system of FIG. 1.

Description of FIG. 3

As mentioned, an asset (e.g., an applet or an operating system) on a secure element in an electronic device may be updated. FIG. 3 presents a flow diagram illustrating a method 300 for updating an asset installed on an electronic device (e.g., electronic device 110 in FIG. 1), which may be performed by a processor in a secure element in the electronic device. For example, the processor may execute a program module that may include instructions for operations in method 300. During operation, the processor may receive, from an updating device, an update package, which may have a digital signature (e.g., operation 310), where the update package may include an update to the asset installed on the secure element.

Then, the processor may identify at least one previous version of the asset (e.g., operation 312) that may be installed on the secure element. For example, the secure element may identify two or more versions of the asset previously installed on the secure element, and may uninstall the two or more previously installed versions of the asset. In some embodiments, the secure element may identify all the previously installed versions of the asset, and may uninstall all of the previously installed versions of the asset. Note that the at least one previous version of the asset may be identified by searching a registry associated with a normal operating system that may be executed by a processor in the secure element.

Moreover, the processor may verify the digital signature of the update package using an encryption key (e.g., operation 314), which may be associated with a vendor of the secure element. In particular, the digital signature may be associated with a private encryption key of the vendor, and the secure element may verify the digital signature using a public encryption key of the vendor. However, in other embodiments, symmetric encryption keys may be used. Thus, in such embodiments, the digital signature may be associated with the encryption key of the vendor, and the secure element may verify the digital signature using the encryption key of the vendor.

In some embodiments, the secure element may optionally decrypt the update package (e.g., operation 316) using a second encryption key, which may be associated with the vendor. This second encryption key may be the same as or different from the encryption key.

Next, the processor may uninstall the at least one previous version of the asset, and may export user data (e.g., operation 318) that may be associated with the at least one previous version of the asset.

Furthermore, the processor may install the update to the asset, and may personalize the asset using the user data (e.g., operation 320).

Then, the processor may update one or both of counter 233 and/or log 235 based on the asset update (e.g., operation 322). In some embodiments, counter 233 may be incremented or otherwise updated when any secure element asset (e.g., applet or operating system) is updated and/or only when an applet secure element asset is updated and/or only when an operating system secure element asset is updated. If more than one asset is updated at a particular time, counter 233 may be incremented or otherwise updated once for each asset that is updated or once for all the simultaneously updated assets. Similarly, in some embodiments, a new entry may be added to log 235 and/or log 235 may be otherwise updated with any suitable information when any secure element asset (e.g., applet or operating system) is updated and/or only when an applet secure element asset is updated and/or only when an operating system secure element asset is updated. If more than one asset is updated at a particular time, log 235 may be updated with any suitable information once for each asset that is updated or once for all the simultaneously updated assets. In some particular embodiments, counter 233 may be incremented or otherwise updated when any secure element asset (e.g., applet or operating system) is updated, where each update to counter 233 may be provided as a new entry in log 235, while a new descriptive entry about a particular secure element asset update may only be added to log 235 only when an operating system secure element asset is updated. Therefore, in such embodiments, the only specific descriptive information that may be provided in log 235 may be with respect to each operating system update that has been provided on the secure element, while each increment of counter 233 may also be provided in log 235, which may provide a frame of reference in log 235 as to when each specific operating system update occurred with respect to all secure element asset updates generally (e.g., both applet and operating system updates due to increments of counter 233 always being identified in log 235). For example, the below Table 1 may be an illustrative example of nine (9) entries in an exemplary log 235, whereby each entry may be associated with a new counter value (e.g., where counter 233 may be incremented each time any secure element asset is updated, and the new counter value is added as a new entry in log 235), and whereby only some entries are associated with an update description that may be descriptive of a particular type of secure element asset update (e.g., only for each secure element operating system update). Therefore, following the below example of Table 1, it may be determined that two new applet secure element assets may have been updated between when secure element operating system 1 was provided on secure element 230 and when secure element operating system 2 was provided (e.g., as updated from secure element operating system 1), and then secure element operating system 3 was provided (e.g., as updated from secure element operating system 2) prior to any other applet secure element assets being updated, and so on.

TABLE 1

| Counter Value | Update Description |
|---|---|
| 1 | Operating System 1 |
| 2 | |
| 3 | |
| 4 | Operating System 2 |
| 5 | Operating System 3 |
| 6 | |
| 7 | Operating System 4 |
| 8 | |
| 9 | Operating System 5 |

In some embodiments, the following may be representative of an exemplary structure of a log 235 pursuant to abstract syntax notation one ("ASN1"):

```
SEHistory ::= SEQUENCE
{
    seOrigin SEState,
    seUpdates SEQEUENCE OF SEUpdate
}
SEUpdate ::= SEQUENCE
{
    seState SEState,
    updateType UpdateType
}
SEState ::= SEQUENCE
{
    platformIdentifier OCTET STRING,
    appletBundleNumber OCTETE STRING
```

-continued

```
}
UpdateType ::= ENUMERATED {ksn, ktp, kud}
```

At any point, the value of counter 233 and/or any portion of log 235 (e.g., the description of the most recently updated main SE operating system) and/or all of log 235 (e.g., descriptions of each main SE operating system that has ever been updated on secure element 230 along with interspersed counter values) may be retrieved from secure element 230 by any suitable component, such as processing subsystem 210 (e.g., for displaying such information to a user on display subsystem 240 and/or for analysis by any suitable program module 246 and/or for sharing with any suitable remote device 112 (e.g., an external reader or terminal)). In some embodiments, a particular log and/or counter retrieval command may be generated (e.g., at processing subsystem 210 or by a remote device 112) and directed to secure element 230 (e.g., via ISD 237 (e.g., to be received by main SE operating system 232 when OS 232 may be running)) and/or directly to updating SE operating system 234 if updating SE operating system 234 is currently running. In one embodiment, a default retrieve command would be sent to secure element 230 for use by main SE operating system 232 (e.g., via ISD 237 for purposes related to security, decoding, encrypting, signing, etc.). In such embodiments, if main SE operating system 232 is currently running on secure element 230, the requested log and/or counter may be retrieved and returned out from secure element 230. However, if updating SE operating system 234 is running instead of main SE operating system 232 on secure element 230, such a default-type of retrieve command may fail, in which case another type of retrieve command would be sent to secure element 230 that may be used by updating SE operating system 234 such that the requested log and/or counter may be retrieved and returned out from secure element 230. This may enable the log and/or counter to be retrievable no matter what operating system state exists on secure element 230, such that the log and/or counter may be retrieved to assess any possible type of crash scenario or otherwise on secure element 230.

It is understood that the steps shown in FIG. 3 are merely illustrative and that existing steps may be modified or omitted, additional steps may be added, and the order of certain steps may be altered.

Note that one or more of the operations in method 300 may be performed by an updating SE operating system (e.g., updating SE operating system 234) that may be executed by the processor in the secure element (e.g., processor 231 of secure element 230), and the updating operating system may be separate from the normal operating system, executed by the processor, which may perform other functions of the secure element. Alternatively, one or more of the operations in method 300 may be performed by the normal operating system (e.g., main SE operating system 232) and/or by a program module executing in an environment associated with the normal operating system. This approach may be illustrated further below with reference to FIGS. 4 and 6.

In an exemplary embodiment, the update technique may allow updates to one or more Java Card applet assets on an electronic device that may include a secure element (e.g., applet 236 of secure element 230 in FIG. 2) and/or to a main SE operating system asset on a secure element of an electronic device (e.g., main SE operating system 232 of secure element 230 in FIG. 2). In addition, to instantiating or installing the new version, or, alternatively, the new instance, of the asset, the update technique may securely transfer user data from the previous version(s) of the asset (e.g., the currently installed version) to the new version of the asset, and may uninstall or delete the previous version(s) of the asset. This update technique may address several problems and challenges that may be associated with secure updates to Java Card applets or main operating systems installed on a secure element.

In particular, in other update techniques, a Java Card applet may be loaded onto the secure element in the form of a binary and/or executable load file. An applet instance or version may be installed from these binaries and may be used to support a variety of use-cases. It is to be understood that an update package may include binaries for one or more applets having a common class application identifier or class AID. Thus, updates for applets having different class AIDs may be included in different update packages. Updates to the applet software may typically involve loading the binary for a new version to the secure element, installing the new version of the applet, and then personalizing the new version of the applet.

However, once the new binary is loaded onto the secure element, there may not be any information that the secure element can use to determine that the new binary is a new version of an existing binary and to proceed with the creation of new versions of the applets for each of the versions of the installed applets associated with the new binary. Consequently, in such update techniques, a new instance may need to be created for each instance or version currently installed on the secure element.

Furthermore, the applets may use user data that can be populated during a personalization phase and or during its use. However, in the absence of an approach for securely transferring this data from one applet instance to another in such other update techniques, a time-consuming re-personalization operation may be needed and/or the user data may be lost.

In addition, by requiring two versions of the same binary to be maintained along with twice the number of applet instances, such other update techniques may constrain limited memory in the secure element.

In the disclosed update technique, a supplemental-security-domain data-store global service in the secure element (e.g., secure element 230 in FIG. 2) may provide encryption key management and/or communication access to external entities (e.g., updating device 112 in FIG. 1). Moreover, security domains on the secure element may expose a global service to their associated applications, which may allow them to import and export data to a secure data store that may be managed by the supplemental security domain.

As described below with reference to FIGS. 4 and 5, when the electronic device may receive an update package, which may include new operating-system code, a new package or binary with a different AID than the current package AID, and/or meta data, an on-board or internal deletion and data-export process may occur. Then, as described below with reference to FIGS. 6 and 7, an on-board installation and asset-personalization process may occur.

Moreover, during these processes, one or more registry-entry objects in the normal operating system (e.g., operating system 232 in FIG. 2) may be augmented with a "secondary AID" field. In particular, a registry entry for an instance or version of an applet may include a package AID, a class AID, an AID, a secondary AID, an associated security domain, privileges, and/or a life-cycle state. The meta-data section in the update package may include the package AID, as well as the package AIDs of the previous versions of the applet that may be signed using the operating-system update private-verification encryption key.

After receiving the update package, the secure enclave processor (e.g., secure enclave processor 220 in FIG. 2) may extract the meta data and use it to construct an update-applets command, which may sometimes be referred to as an "update-applets application-protocol-data-unit command," that it may send to the secure element. Then, the secure element may receive the update-applets command sent to the master or issuer security domain.

Figure 4:
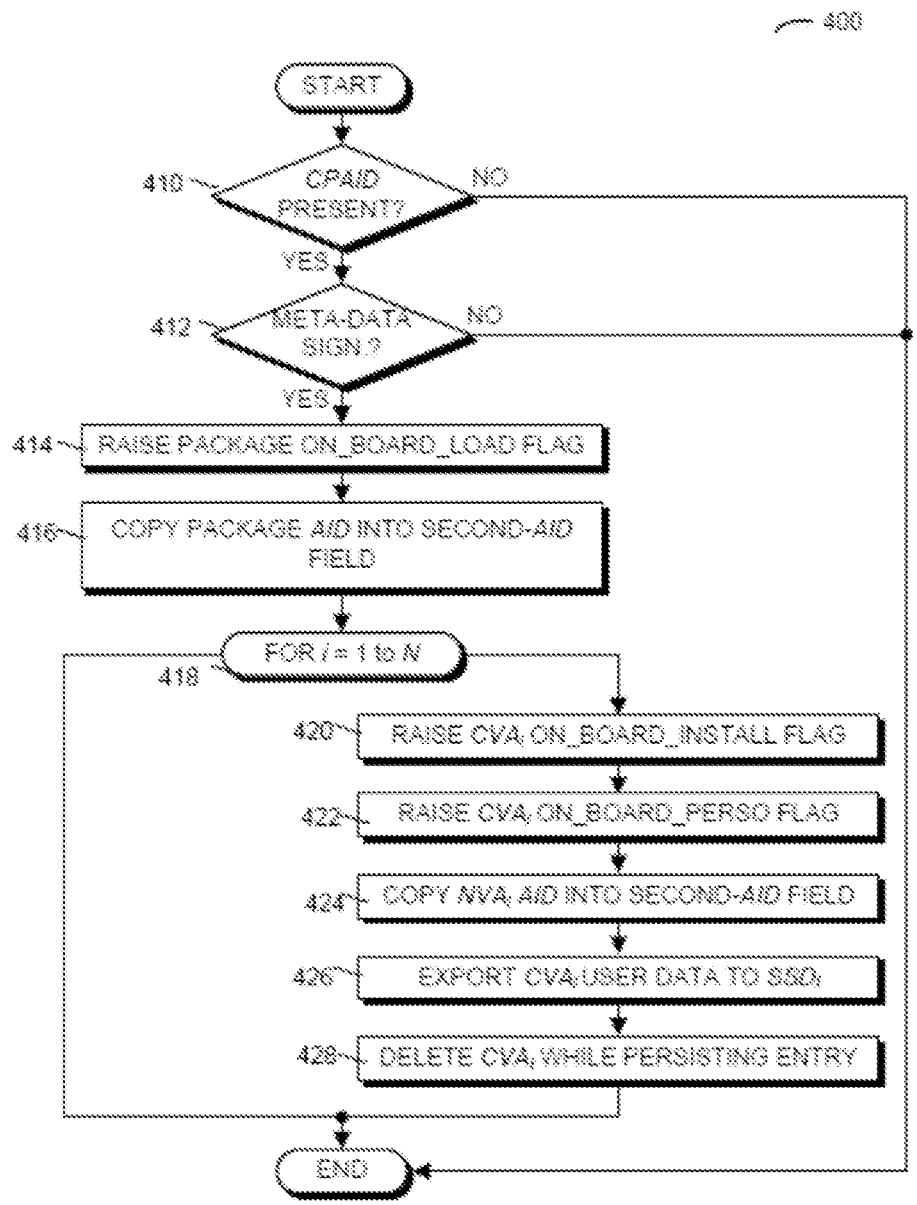

Description of FIG. 4

As shown in FIG. 4, which presents a flow diagram illustrating a method 400 for uninstalling a version of an applet and exporting personal data (e.g., in electronic device 110), where the normal operating system in the secure element may browse the registry searching (e.g., operation 410) for the current package AID ("CPAID"). If a similar package AID is found, the normal operating system may proceed with the verification of the digital signature of the meta data (e.g., operation 412). Moreover, if the signature verification is successful, the secure element may start the on-board deletion. The normal operating system may then raise an "on-board flag" in the registry entry of the package (e.g., operation 414). This on-board flag may be kept raised until the installation and personalization process described below may be complete. In addition, the normal operating system may copy the current package AID into the secondary AID field of the package registry entry (e.g., operation 416). Thus, the registry entry for a package may include the on_board_load flag and one more applet entries. Each of these applet entries for the package may include an associated on_board_install flag, as well as the package AID, the class AID, the AID, the secondary AID, the associated security domain, the privileges, and/or the life-cycle state.

Furthermore, the normal operating system may browse the registry for all applets instantiated from the package to be updated (e.g., operation 418). For each applet (e.g., 1 to N), the normal operating system may raise one, some, or all of the following flags in registry entry for the current version of the applet ("CVA"): "on_board_install," which may be kept raised until the corresponding applet from the update package has been installed (e.g., operation 420), and "on_board_perso," which may be kept raised until the corresponding applet from the update package has been personalized using the migrated user data (e.g., operation 422).

Additionally, the normal operating system may store the new version of the applet ("NVA") AID provided in the update table in the update package in each corresponding registry entry (e.g., operation 424). This AID may replace the current version of the applet AID once the on_board_install flag has been lowered. It is to be understood that for applet AIDs that are not included in the update table, the current version of the applet AID may be populated in the secondary AID field.

Moreover, it is to be understood that each version or instance to be deleted, including the applets not present in the update table, may be triggered prior to its deletion and may export its user data to its associated supplemental security domain ("SSD") (e.g., operation 426). As described previously, the supplemental security domain may implement a global service and/or expose the data-store interface. Upon receipt of a global-service request, the associated supplemental security domain may check that the applet requesting the global service is one of its associated applications based on the registry entry of the applet.

Once all current versions of the applets have been successfully deleted (e.g., operation 428), the normal operating system in the secure element may block any subsequent application protocol data unit messages (e.g., atomic messages between entities or components in the electronic device) except, for example, a command that may select the issuer security domain and/or other suitable update-applets commands. Thus, the normal operating system may reject other application-protocol-data-unit commands (e.g., with a particular status word).

It is understood that the steps shown in FIG. 4 are merely illustrative and that existing steps may be modified or omitted, additional steps may be added, and the order of certain steps may be altered.

Figure 5:
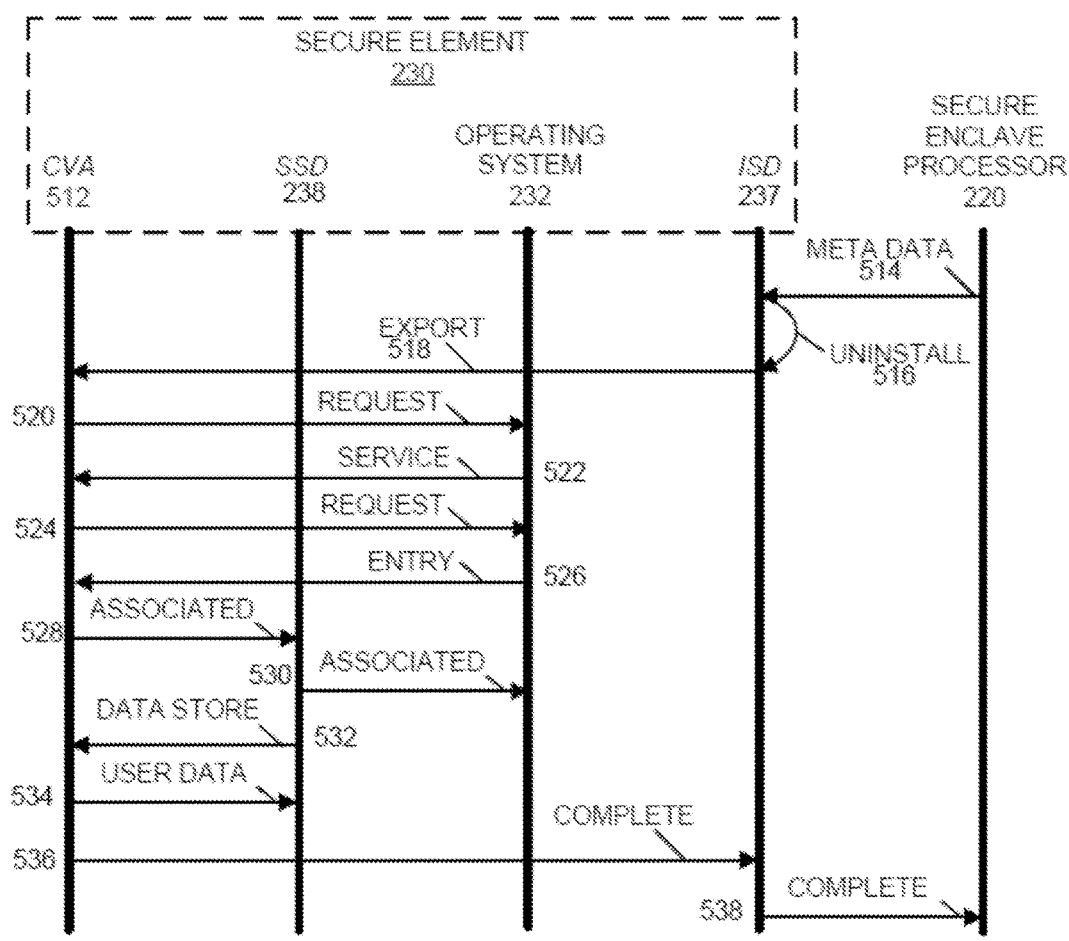

Description of FIG. 5

The communication within electronic device 110 during method 400 may be shown in FIG. 5. In particular, secure enclave processor 220, and, more generally, processing subsystem 210 in FIG. 2, may provide meta data from an update packet to issuer security domain ("ISD") 237 in secure element 230 (e.g., operation 514). This may be decrypted, encrypted, or reformatted in any suitable way by ISD 237 (e.g., using any suitable key or keys) (e.g., operation 516) and may then be forwarded as an export command (e.g., operation 518) to a current version of the applet ("CVA") 512, which may request (e.g., operation 520) the supplemental security domain for global service from operating system 232. After receiving information specifying supplemental security domain 238 (e.g., operation 522), CVA 512 may request the registry-entry object or pointer from operating system 232 (e.g., operation 524), which may be provided to CVA 512 (e.g., operation 526).

Then, CVA 512 may confirm it is associated with supplemental security domain 238 (e.g., operation 528), which in turn may confirm the association with operating system 232 (e.g., operation 530). Next, supplemental security domain 238 may provide a handle to the data store to CVA 512 (e.g., operation 532). In response, CVA 512 may export user data to supplemental security domain 238 (e.g., operation 534), and may indicate that it is done to ISD 237 (e.g., operation 536), which in turn may notify secure enclave processor 220 (e.g., operation 538).

After the current version of one or more applet instances or versions have been successfully deleted and their user data has been successfully exported to their associated security domain, the electronic device (e.g., the secure enclave processor) may trigger the secure element to boot in operating-system update mode (e.g., updating operating system 234 in FIG. 2 may be used). Then, the electronic device may send the operating-system update bundle to the secure element, which optionally may update its operating-system software in addition to storing the update packages in its memory. In addition, the updating operating system may populate the package AID field with the new package AID value. Note that the updating operating system and the normal operating system may exchange information via flags, such as the on_board_load flag.

It is understood that the steps shown in FIG. 5 are merely illustrative and that existing steps may be modified or omitted, additional steps may be added, and the order of certain steps may be altered.

Figure 6:
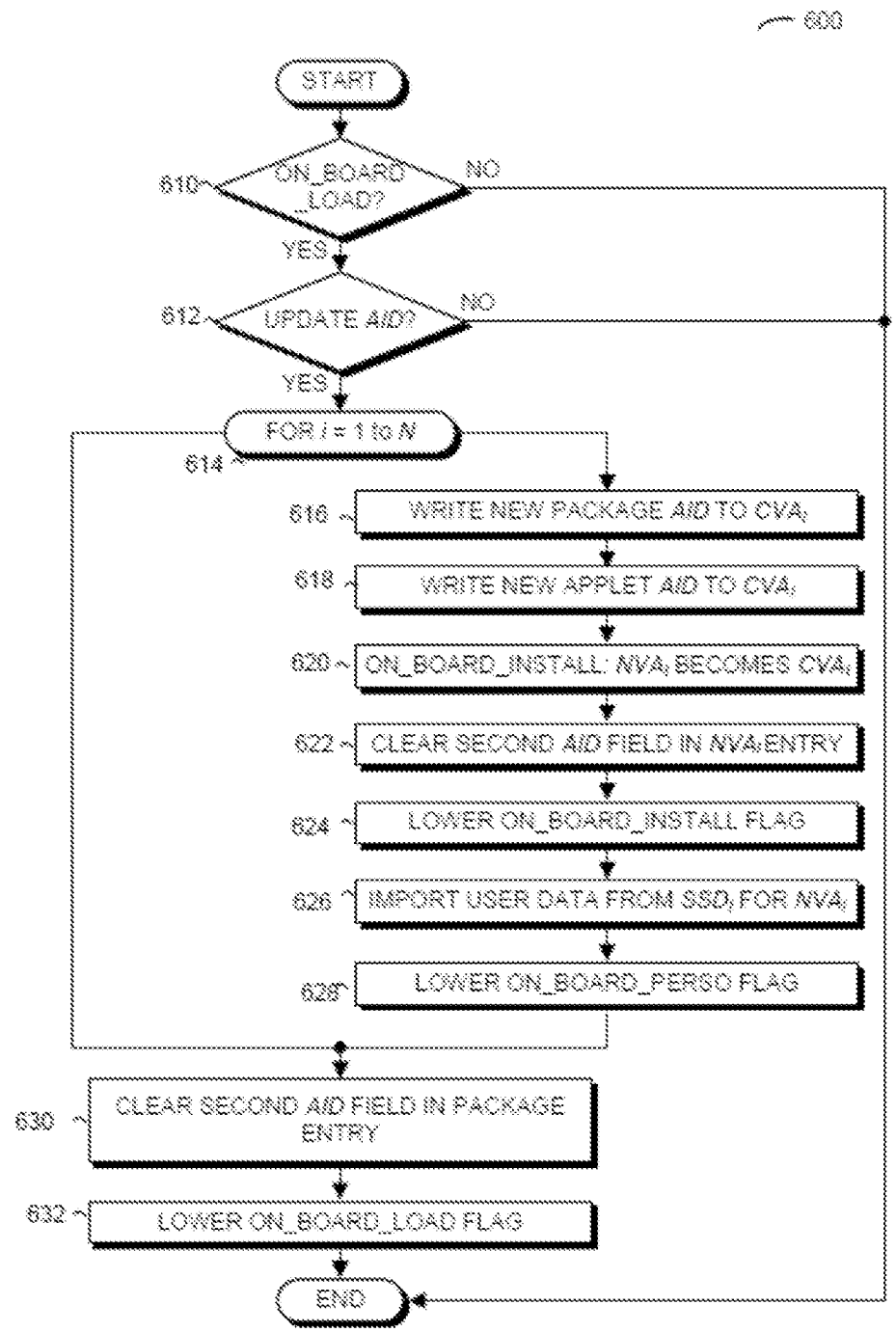

Description of FIG. 6

After the operating-system update, the electronic device may send an update-applets application-protocol-data-unit ("APDU") command to the issuer security domain. Then, as shown in FIG. 6, which presents a flow diagram illustrating a method 600 for installing a new version of an applet and importing personal data on electronic device 110, the normal operating system (e.g., operating system 232 in FIG. 2) may browse the registry for the package with on_board_load flag raised (e.g., operation 610). If an update or new package has been uploaded, the update package AID may be present in the second AID field of the registry entry for the package. Otherwise, the current package AID may be present.

If an update package has been uploaded (e.g., operation 612), the normal operating system may create a new instance or version for each applet (e.g., 1 to N) having a registry entry flagged with the on_board_install flag (e.g., operation 614). In particular, the normal operating system may first replace the current package AID field of the registry entry for the applet with the update or new package AID (e.g., operation 616), and then may replace the AID field of the registry entry for the applet with the update or new version of the applet AID previously stored in the secondary AID field of the registry entry for the applet (e.g., operation 618).

Alternatively, if no update or new package has been uploaded, the normal operating system may re-create all the instances or versions deleted during the on-board delete.

If the installation is successful (e.g., operation 620), the normal operating system may lower the on_board_install flag (e.g., operation 624) and the normal operating system may clear the secondary AID field of the registry entry for the applet (e.g., operation 622). It is to be understood that each update or new version of the applet may be triggered during its installation and may import its data from its associated security domain.

Moreover, if the user data has been successfully imported (e.g., the installed new version of the applet has been personalized) (e.g., operation 626), the normal operating system may lower the on_board_perso flag in the registry entry for the applet (e.g., operation 628).

The installation of the update or new versions of the applets may take place within the context of the update-applets application-protocol-data-unit command. If an error is reported by the secure element, the electronic device may send another update-applets application-protocol-data-unit command.

Note that the normal operating system in the secure element may enforce a rule that only one successful update-applets application-protocol-data-unit command can be processed after the operating-system update takes place. However, the electronic device can send multiple update-applets application-protocol-data-unit commands until it receives a completion response from the issuer security domain.

After all applet instances or versions have been created and re-personalized, the normal operating system in the secure element may lower the on_board_load flag (e.g., operation 632) from the registry entry for the package and may clear the secondary AID field (e.g., operation 630).

It is understood that the steps shown in FIG. 6 are merely illustrative and that existing steps may be modified or omitted, additional steps may be added, and the order of certain steps may be altered.

Figure 7:
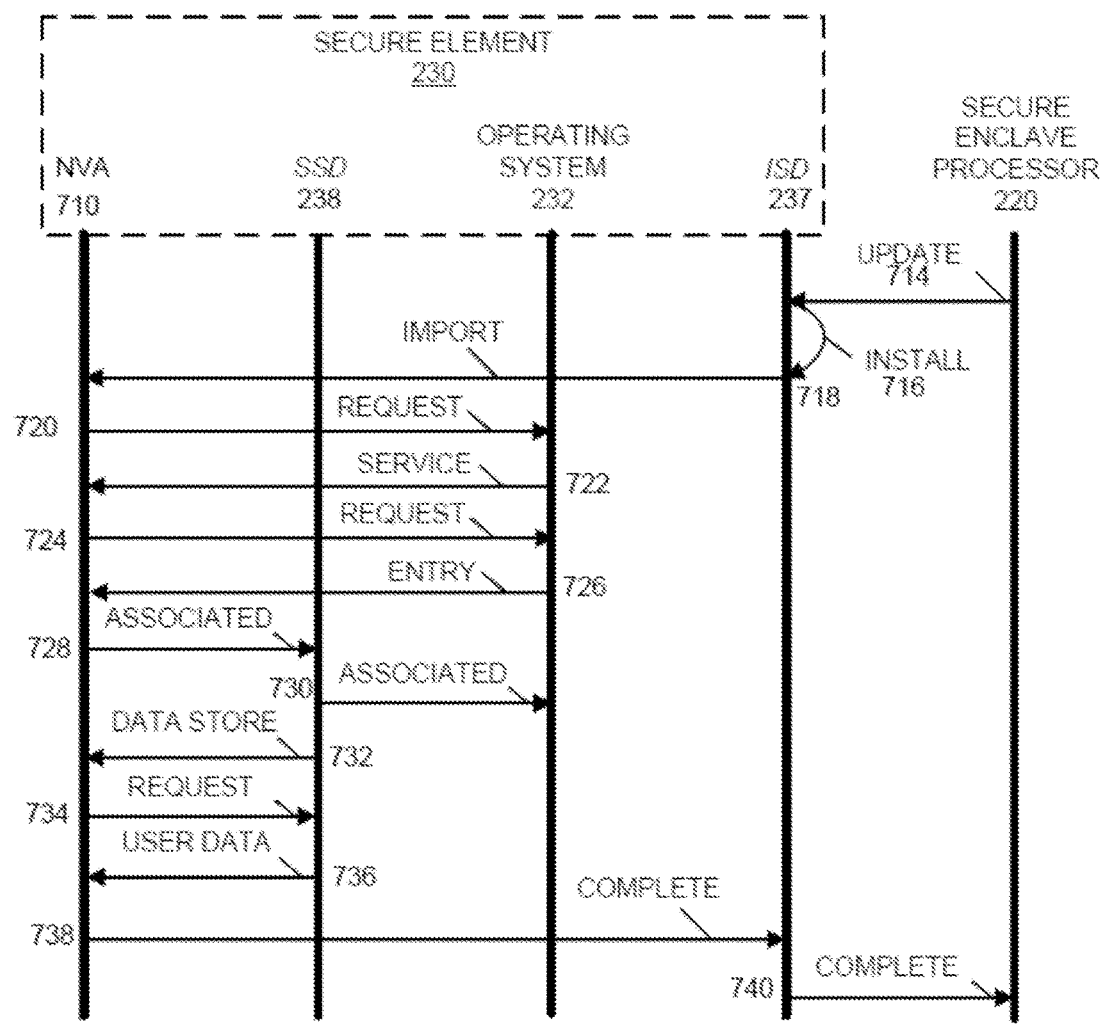

Description of FIG. 7

The communication within electronic device 110 during method 600 may be shown in FIG. 7. In particular, secure enclave processor 220, and, more generally, processing subsystem 210 in FIG. 2, may provide an update command to issuer security domain ("ISD") 237 in secure element 230 (e.g., operation 714). This may decrypted, encrypted, or reformatted in any suitable way by ISD 237 (e.g., using any suitable key or keys) (e.g., operation 716) and may then be forwarded as an import command to an update or new version of the applet ("NVA") 710 (e.g., operation 718), which may request the supplemental security domain for global service from operating system 232 (e.g., operation 720). After receiving information specifying supplemental security domain 238 (e.g., operation 722), NVA 710 may request the registry-entry object or pointer from operating system 232 (e.g., operation 724), which may then be sent to NVA 710 (e.g., operation 726).

Then, NVA 710 may confirm it is associated with supplemental security domain 238 (e.g., operation 728), which in turn may confirm the association with operating system 232 (e.g., operation 730). Next, supplemental security domain 238 may provide a handle to the data store to NVA 710 (e.g., operation 732). In response, NVA 710 may send a request for (e.g., operation 734) and then import (e.g., operation 736) user data from supplemental security domain 238, and may indicate that it is done to ISD 237 (e.g., operation 738), which in turn may notify secure enclave processor 220 (e.g., operation 740).

It is understood that the steps shown in FIG. 7 are merely illustrative and that existing steps may be modified or omitted, additional steps may be added, and the order of certain steps may be altered.

Description of FIG. 8

As noted previously, the registry entries for a package may be updated during the update technique. This may be illustrated in FIG. 8, which may present registry entries for a credit-card package with a package AID and three associated instances of credit-card payment applets before and after an update.

In these ways, the update technique may facilitate secure and scalable dissemination, installation and personalization of updates to one or more applets previously installed on electronic devices.

Note that the operations illustrated in FIGS. 5 and 7 may include challenge and response operations, which may not be shown for clarity. Furthermore, the order of the operations of one or more of FIGS. 3-7 may be changed, and/or two or more operations may be combined into a single operation. For example, the operations in one or more of FIGS. 3-7 may be performed by a different processor in the electronic device, such as a secure enclave processor.

Figure 9:
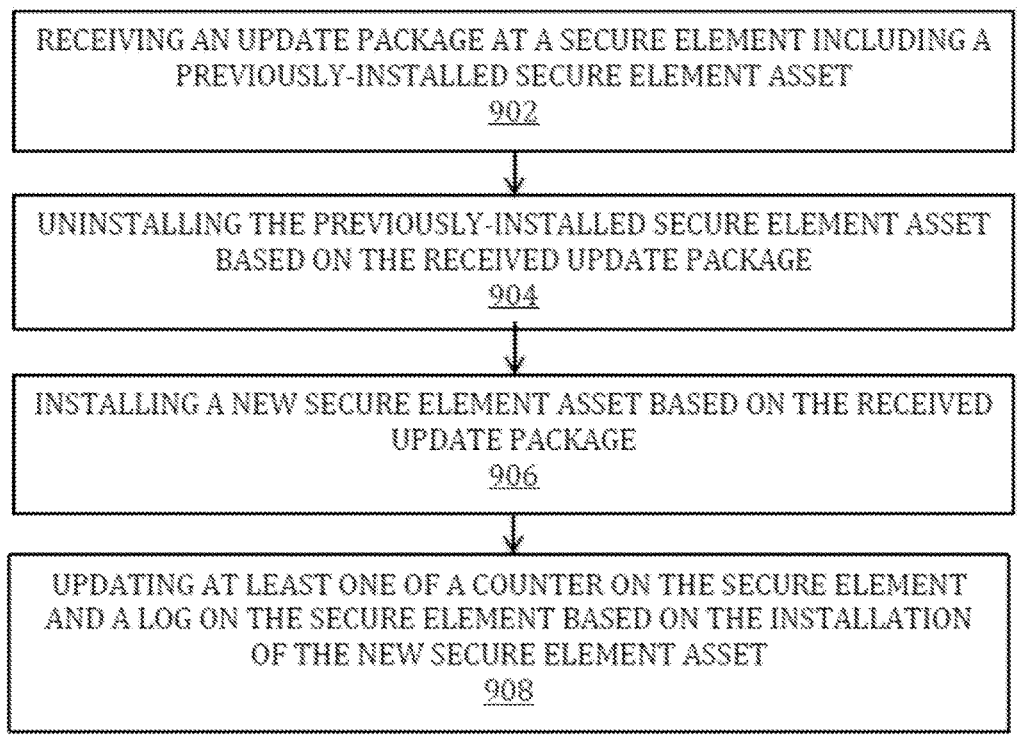
FIG. 9 is a flowchart of an illustrative process for logging secure element updates of an electronic device.

Description of FIG. 9

FIG. 9 is a flowchart of an illustrative process 900 for logging secure element updates of an electronic device. At step 902, process 900 may include, at a secure element including a previously-installed secure element asset, receiving an update package. For example, when main SE operating system 232 has been previously-installed on secure element 230 of electronic device 110, updating operating system 234 on secure element 230 may receive an update package (e.g., from other device 112 of FIG. 1). Next, at step 904, process 900 may include uninstalling the previously-installed secure element asset based on the received update package on the secure element. For example, updating operating system 234 may uninstall previously-installed main SE operating system 232 from secure element 230.

Next, at step 906, process 900 may include installing a new secure element asset based on the received update package on the secure element. For example, updating operating system 234 may install a new main SE operating system 232 on secure element 230. Then, at step 908, process 900 may include updating at least one of a counter on the secure element and a log on the secure element based on the installation of the new secure element asset. For example, based on the installation of new main SE operating system 232 on secure element 230, counter 233 of secure element 230 and/or log 235 on secure element 230 may be updated.

It is understood that the steps shown in process 900 of FIG. 9 are merely illustrative and that existing steps may be modified or omitted, additional steps may be added, and the order of certain steps may be altered.

Further Description of FIG. 1 and FIG. 2

Other device 112 of FIG. 1 may be any suitable device that may be controlled or otherwise managed by any suitable entity, such as a commercial entity subsystem, such as a manufacturer of electronic device 110, and/or a financial institution subsystem, such as a service provider responsible for one or more payment credentials represented by one or more payment applets 236. Although not shown, device 112 of FIG. 1 may be a secure platform system and may include a secure mobile platform ("SMP") broker component, an SMP trusted services manager ("TSM") component, an SMP crypto services component, an identity management system ("IDMS") component, a fraud system component, a hardware security module ("HSM") component (e.g., a factory HSM), and/or a store component. One, some, or all components of device 112 may be implemented using one or more processor components, which may be the same as or similar to one or more components of device 110, such as processing component(s), memory component(s), communication component(s), and the like.

An SMP broker component of device 112 may be configured to manage secure communication authentication with device 110 (e.g., secure element 230 of device 100). An operating system or other application of device 110 may be configured to call specific application programming interfaces ("APIs") and an SMP broker component may be configured to process requests of those APIs and respond with data that may derive the user interface of device 100 and/or respond with application protocol data units ("APDUs") that may communicate with secure element 230 of device 110 (e.g., via a communication path between device 112 and device 110). An SMP TSM component of device 112 may be configured to provide GlobalPlatform-based services that may be used to carry out operations on device 110. GlobalPlatform, or any other suitable secure channel protocol, may enable such an SMP TSM component to properly communicate and/or provision sensitive account data between secure element 230 of device 110 and a TSM for secure data communication.

An SMP TSM component of device 112 may be configured to use an HSM component to protect its keys and generate new keys. An SMP crypto services component of device 112 may be configured to provide key management and cryptography operations that may be required for user authentication and/or confidential data transmission between various components of system 100. Such an SMP crypto services component may utilize an HSM component of device 112 for secure key storage and/or opaque cryptographic operations.

As mentioned, electronic device 110 can include, but is not limited to, a music player (e.g., an iPod™ available by Apple Inc. of Cupertino, Calif.), video player, still image player, game player, other media player, music recorder, movie or video camera or recorder, still camera, other media recorder, radio, medical equipment, domestic appliance, transportation vehicle instrument, musical instrument, calculator, cellular telephone (e.g., an iPhone™ available by Apple Inc.), other wireless communication device, personal digital assistant, remote control, pager, computer (e.g., a desktop, laptop, tablet (e.g., an iPad™ available by Apple Inc.), server, etc.), monitor, television, stereo equipment, set up box, set-top box, boom box, modem, router, printer, or any combination thereof. In some embodiments, electronic device 110 may perform a single function (e.g., a device dedicated to conducting financial transactions) and, in other embodiments, electronic device 110 may perform multiple functions (e.g., a device that conducts financial transactions, plays music, and receives and transmits telephone calls). Electronic device 110 may be any portable, mobile, hand-held, or miniature electronic device that may be configured to conduct financial transactions wherever a user travels. Some miniature electronic devices may have a form factor that is smaller than that of hand-held electronic devices, such as an iPod™. Illustrative miniature electronic devices can be integrated into various objects that may include, but are not limited to, watches, rings, necklaces, belts, accessories for belts, headsets, accessories for shoes, virtual reality devices, glasses, other wearable electronics, accessories for sporting equipment, accessories for fitness equipment, key chains, or any combination thereof. Alternatively, electronic device 110 may not be portable at all, but may instead be generally stationary.

Memory subsystem 212 may include one or more storage mediums, including for example, a hard-drive, flash memory, permanent memory such as read-only memory ("ROM"), semi-permanent memory such as random access memory ("RAM"), any other suitable type of storage component, or any combination thereof. Memory subsystem 212 may include cache memory, which may be one or more different types of memory used for temporarily storing data for electronic device applications. Memory subsystem 212 may be fixedly embedded within electronic device 110 or may be incorporated on one or more suitable types of cards that may be repeatedly inserted into and removed from electronic device 110 (e.g., a subscriber identity module ("SIM") card or secure digital ("SD") memory card). Memory subsystem 212 may store media data (e.g., music and image files), software (e.g., for implementing functions on device 110), firmware, preference information (e.g., media playback preferences), lifestyle information (e.g., food preferences), exercise information (e.g., information obtained by exercise monitoring equipment), transaction information (e.g., information such as credit card information), wireless connection information (e.g., information that may enable device 100 to establish a wireless connection), subscription information (e.g., information that keeps track of podcasts or television shows or other media a user subscribes to), contact information (e.g., telephone numbers and e-mail addresses), calendar information, any other suitable data, or any combination thereof.

Networking subsystem 214 may be provided to allow device 110 to communicate with one or more other electronic devices or servers or subsystems (e.g., one or more devices 112 of system 100) using any suitable communications protocol. For example, networking subsystem 214 may support Wi-Fi (e.g., an 802.11 protocol), ZigBee (e.g., an 802.15.4 protocol), WiDi™, Ethernet, Bluetooth™, Bluetooth™ Low Energy ("BLE"), high frequency systems (e.g., 900 MHz, 2.4 GHz, and 5.6 GHz communication systems), infrared, transmission control protocol/internet protocol ("TCP/IP") (e.g., any of the protocols used in each of the TCP/IP layers), Stream Control Transmission Protocol ("SCTP"), Dynamic Host Configuration Protocol ("DHCP"), hypertext transfer protocol ("HTTP"), BitTorrent™, file transfer protocol ("FTP"), real-time transport protocol ("RTP"), real-time streaming protocol ("RTSP"), real-time control protocol ("RTCP"), Remote Audio Output Protocol ("RAOP"), Real Data Transport Protocol™ ("RDTP"), User Datagram Protocol ("UDP"), secure shell protocol ("SSH"), wireless distribution system ("WDS") bridging, any communications protocol that may be used by wireless and cellular telephones and personal e-mail devices (e.g., Global System for Mobile Communications ("GSM"), GSM plus Enhanced Data rates for GSM Evolution ("EDGE"), Code Division Multiple Access ("CDMA"), Orthogonal Frequency-Division Multiple Access ("OFDMA"), high speed packet access ("HSPA"), multi-band, etc.), any communications protocol that may be used by a low power Wireless Personal Area Network ("6LoW-PAN") module, any other communications protocol, or any combination thereof. Networking subsystem 214 may be configured to determine a geographical position of electronic device 110. For example, networking subsystem 214 may utilize the global positioning system ("GPS") or a regional or site-wide positioning system that may use cell tower positioning technology or Wi-Fi technology.

Electronic device 110 may also include near field communication ("NFC") capabilities, including any suitable proximity-based communication mechanism that may enable contactless proximity-based transactions or communications between electronic device 110 and a merchant POS terminal (e.g., device 112 as a POS merchant terminal), which may allow for close range communication at relatively low data rates (e.g., 424 kbps), and may comply with any suitable standards, such as ISO/IEC 7816, ISO/IEC 18092, ECMA-340, ISO/IEC 21481, ECMA-352, ISO 14443, and/or ISO 15693. Alternatively or additionally, such NFC capability may allow for close range communication at relatively high data rates (e.g., 370 Mbps), and may comply with any suitable standards, such as the TransferJet™ protocol. Such NFC communication between device 110 and device 112 may occur within any suitable close range distance, such as a range of approximately 2 to 10 centimeters, and may operate at any suitable frequency (e.g., 13.56 MHz). For example, such close range communication of an NFC capability of device 110 may take place via magnetic field induction and/or to retrieve information from tags having radio frequency identification ("RFID") circuitry.

Secure element 230 may be configured to provide a tamper-resistant platform (e.g., as a single or multiple chip secure microcontroller) that may be capable of securely hosting applications and their confidential and cryptographic data in accordance with rules and security requirements that may be set forth by a set of well-identified trusted authorities (e.g., an authority of financial institution subsystem and/or an industry standard, such as GlobalPlatform). Secure element 230 may be a highly secure, tamper-resistant hardware component within a chip, which may be used for storing sensitive data or applications on electronic device 110. At least a portion of secure element 230 may be provided in a removable circuit card, such as a universal integrated circuit card ("UICC") or a subscriber identity module ("SIM") card, that may be used in electronic devices 110 compatible within global system for mobile communications ("GSM") networks, universal mobile telecommunications systems ("UMTS") and/or long-term evolution ("LTE") standard networks. Alternatively or additionally, at least a portion of secure element 230 may be provided in an integrated circuit that may be embedded into electronic device 110 during manufacturing of device 110. Alternatively or additionally, at least a portion of secure element 230 may be provided in a peripheral device that can be plugged into, inserted into, or otherwise coupled to electronic device 110, such as a micro secure digital ("SD") memory card As mentioned, secure element 230 may include one or more of an issuer security domain ("ISD") 237 and a supplemental security domain ("SSD") 238 (e.g., a service provider security domain ("SPSD"), a trusted service manager security domain ("TSMSD"), etc.), which may be defined and managed by an NFC specification standard (e.g., GlobalPlatform). For example, ISD 237 may be a portion of secure element 230 in which a trusted service manager ("TSM") or issuing financial institution may store keys and/or other suitable information for creating or otherwise provisioning one or more credentials (e.g., commerce credentials associated with various credit cards, bank cards, gift cards, access cards, transit passes, digital currency (e.g., bitcoin and associated payment networks), etc.) on electronic device 110, for credential content management, and/or for security domain management. A specific supplemental security domain ("SSD") may be associated with a particular TSM and at least one specific commerce credential (e.g., a specific credit card credential or a specific public transit card credential) that may provide specific privileges or payment rights to electronic device 110.

While device 110 has been described with respect to near field communication, it is to be understood that device 110 may be configured to provide any suitable contactless proximity-based mobile payment or any other suitable type of a contactless proximity-based communication between electronic device 110 and remote device 112 as a merchant. For example, device 110 may be configured to provide any suitable short-range communication, such as those involving electromagnetic/electrostatic coupling technologies.

Moreover, one, some, or all of the processes described with respect to FIGS. 1-9 may each be implemented by software, but may also be implemented in hardware, firmware, or any combination of software, hardware, and firmware. Instructions for performing these processes may also be embodied as machine- or computer-readable code recorded on a machine- or computer-readable medium. In some embodiments, the computer-readable medium may be a non-transitory computer-readable medium. Examples of such a non-transitory computer-readable medium include but are not limited to a read-only memory, a random-access memory, a flash memory, a CD-ROM, a DVD, a magnetic tape, a removable memory card, and a data storage device. In other embodiments, the computer-readable medium may be a transitory computer-readable medium. In such embodiments, the transitory computer-readable medium can be distributed over network-coupled computer systems so that the computer-readable code is stored and executed in a distributed fashion. For example, such a transitory computer-readable medium may be communicated from one electronic device to another electronic device using any suitable communications protocol (e.g., the computer-readable medium may be communicated to electronic device 110 via networking subsystem 214. Such a transitory computer-readable medium may embody computer-readable code, instructions, data structures, program modules, or other data in a modulated data signal, such as a carrier wave or other transport mechanism, and may include any information delivery media. A modulated data signal may be a signal that has one or more of its characteristics set or changed in such a manner as to encode information in the signal.

It is to be understood that any, each, or at least one module or component or subsystems of system 100 may be provided as a software construct, firmware construct, one or more hardware components, or a combination thereof. For example, any, each, or at least one module or component or subsystem of system 100 may be described in the general context of computer-executable instructions, such as program modules, that may be executed by one or more computers or other devices. Generally, a program module may include one or more routines, programs, objects, components, and/or data structures that may perform one or more particular tasks or that may implement one or more particular abstract data types. It is also to be understood that the number, configuration, functionality, and interconnection of the modules and components and subsystems of system 100 are merely illustrative, and that the number, configuration, functionality, and interconnection of existing modules, components, and/or subsystems may be modified or omitted, additional modules, components, and/or subsystems may be added, and the interconnection of certain modules, components, and/or subsystems may be altered.

At least a portion of one or more of the modules or components or subsystems of system 100 may be stored in or otherwise accessible to an entity of system 100 in any suitable manner. For example, any or each module of secure subsystem 218 may be implemented using any suitable technologies (e.g., as one or more integrated circuit devices), and different modules may or may not be identical in structure, capabilities, and operation. Any or all of the modules or other components of system 100 may be mounted on an expansion card, mounted directly on a system motherboard, or integrated into a system chipset component (e.g., into a "north bridge" chip).

Any or each module or component of system 100 (e.g., any or each module of secure subsystem 218) may be a dedicated system implemented using one or more expansion cards adapted for various bus standards. For example, all of the modules may be mounted on different interconnected expansion cards or all of the modules may be mounted on one expansion card. With respect to secure subsystem 218, by way of example only, the components or modules of secure subsystem 218 may interface with a motherboard of device 110 through an expansion slot (e.g., a peripheral component interconnect ("PCI") slot or a PCI express slot). Alternatively, secure subsystem 218 need not be removable but may include one or more dedicated modules that may include memory (e.g., RAM) dedicated to the utilization of the module. In other embodiments, secure subsystem 218 may be integrated into device 110. For example, a module of secure subsystem 218 may utilize a portion of device memory. Any or each module or component of system 100 (e.g., any or each module of secure subsystem 218) may include its own processing circuitry and/or memory. Alternatively, any or each module or component of system 100 (e.g., any or each module of secure subsystem 218) may share processing circuitry and/or memory with any other module of secure subsystem 218 and/or processing subsystem 210 and/or memory subsystem 212 of device 110.

FURTHER APPLICATIONS OF DESCRIBED CONCEPTS

While there have been described systems, methods, and computer-readable media for logging secure element updates of an electronic device, it is to be understood that many changes may be made therein without departing from the spirit and scope of the subject matter described herein in any way. For example, in the preceding description, there may be reference to "some embodiments," however, it is to be noted that "some embodiments" may describe a subset of all of the possible embodiments, but does not always specify the same subset of embodiments. Insubstantial changes from the claimed subject matter as viewed by a person with ordinary skill in the art, now known or later devised, are expressly contemplated as being equivalently within the scope of the claims. Therefore, obvious substitutions now or later known to one with ordinary skill in the art are defined to be within the scope of the defined elements.

Therefore, those skilled in the art will appreciate that the invention can be practiced by other than the described embodiments, which are presented for purposes of illustration rather than of limitation.

What is claimed is:

1. A method comprising:
at a secure element comprising a previously-installed element asset:
receiving an update package comprising an update to the previously-installed secure element asset;
installing a new secure element asset based on the received update package;
in response to the installation of the new secure element asset based on the received update package, updating a value of a counter on the secure element; and
in response to the installation of the new secure element asset based on the received update package, creating a new entry in a log on the secure element, wherein the new entry in the log on the secure element comprises:
the updated value of the counter on the secure element; and
a description of the installation of the new secure element asset based on the received update package.

2. The method of claim 1, further comprising:
at the secure element:
after receiving the update package, identifying the previously-installed secure element asset; and
uninstalling the previously-installed secure element asset based on the received update package.

3. The method of claim 1, wherein:
the previously-installed secure element asset comprises a first operating system; and
the new secure element asset comprises a second operating system.

4. The method of claim 1, wherein:
the previously-installed secure element asset comprises a first payment applet asset; and
the new secure element asset comprises a second payment applet asset.

5. The method of claim 1, wherein:
at least one of the receiving, installing, updating, or creating is performed by an updating operating system being executed by a processor of the secure element; and
the updating operating system is separate from a normal operating system that performs at least one other process of the secure element when executed by the processor of the secure element.

6. An electronic device comprising:
a networking subsystem configured to communicate with an updating device; and
a secure element coupled to the networking subsystem and comprising a previously-installed secure element asset and a secure element processor configured to:
receive, from the updating device via the networking subsystem, an update package comprising an update to the previously-installed secure element asset;
install a new secure element asset based on the received update package;
in response to the installation of the new secure element asset based on the received update package, update a value of a counter on the secure element; and
in response to the installation of the new secure element asset based on the received update package, create a new entry in a log on the secure element, wherein the new entry in the log on the secure element comprises:
the updated value of the counter on the secure element; and
a description of the installation of the new secure element asset based on the received update package.

7. The electronic device of claim 6, wherein the new secure element asset comprises a payment applet asset of the secure element.

8. The electronic device of claim 6, wherein the new secure element asset comprises an operating system asset of the secure element.

9. The electronic device of claim 6, wherein the secure element processor is further configured to:
receive a retrieval command; and
transmit a copy of the log from the secure element in response to the received retrieval command.

10. The electronic device of claim 6, wherein the secure element processor is further configured to:
receive a retrieval command; and
transmit a current value of the counter from the secure element in response to the received retrieval command.

11. The electronic device of claim 6, wherein the secure element processor is further configured to:
receive a retrieval command; and
transmit a last update to the log from the secure element in response to the received retrieval command.

12. The electronic device of claim 6, wherein the secure element processor is further configured to:
after the update package has been received, identify the previously-installed secure element asset; and
uninstall the previously-installed secure element asset based on the received update package.

13. The electronic device of claim 12, wherein the secure element processor is further configured to search a registry associated with a normal operating system to be executed by the secure element processor to identify the previously-installed secure element asset.

14. The electronic device of claim 6, wherein:
the secure element processor is further configured to do at least one of the receiving, installing, updating, or creating operations when executing an updating operating system; and
the updating operating system is separate from a normal operating system to be executed by the secure element processor when performing another operation of the secure element.

15. A computer-program product for use in conjunction with a secure element comprising a previously-installed secure element asset, the computer-program product comprising a non-transitory computer-readable storage medium and a computer-program mechanism embedded therein, to update the secure element, the computer-program mechanism comprising:
- instructions configured to receive, at the secure element, an update package comprising an update to the previously-installed secure element asset;
- instructions configured to install, on the secure element, a new secure element asset based on the received update package;
- in response to the installation of the new secure element asset based on the received update package, instructions configured to update a value of a counter on the secure element; and
- in response to the installation of the new secure element asset based on the received update package, instructions configured to create a new entry in a log on the secure element, wherein the new entry in the log on the secure element comprises:
  - the updated value of the counter on the secure element; and
  - a description of the installation of the new secure element asset based on the received update package.

* * * * *